United States Patent [19]

DeMarco

[11] Patent Number: 5,319,036
[45] Date of Patent: Jun. 7, 1994

[54] CURING SYSTEM FOR POLYACRYLATE RUBBERS

[75] Inventor: Robert D. DeMarco, Louisville, Ky.

[73] Assignee: Zeon Chemicals U.S.A., Inc., Louisville, Ky.

[21] Appl. No.: 79,903

[22] Filed: Jun. 23, 1993

[51] Int. Cl.$^5$ .............................................. C08F 8/42
[52] U.S. Cl. ............................ 525/366; 525/329.9; 525/330.5; 525/374; 525/377; 525/379
[58] Field of Search ................. 525/366, 374, 377, 379

[56] References Cited

U.S. PATENT DOCUMENTS

| | | |
|---|---|---|
| 3,875,092 | 4/1975 | Morris ............................ 525/329.9 |
| 3,910,866 | 10/1975 | Morris . |
| 3,912,672 | 10/1975 | Morris et al. . |
| 3,919,143 | 11/1975 | Morris . |
| 5,008,345 | 4/1991 | Wolf . |
| 5,079,304 | 1/1992 | DeMarco . |
| 5,081,194 | 1/1992 | Wolf . |

*Primary Examiner*—Bernard Lipman
*Attorney, Agent, or Firm*—Armstrong, Westerman, Hattori, McLeland & Naughton

[57] ABSTRACT

Compositions containing polyacrylate rubbers having dual curing sites are cured using an improved curing system comprising an alkali metal of a long chain carboxylic acid, a tertiary amine having a two methyl groups and a longer chain alkyl group, and a disubstituted urea. The compositions are shelf stable, have a high degree of scorch safety and cure rapidly at curing temperatures without adversely affecting the compression set of the cured article.

6 Claims, No Drawings

CURING SYSTEM FOR POLYACRYLATE RUBBERS

FIELD OF THE INVENTION

The present invention relates to an improved method for curing compositions containing a polyacrylate rubber having dual curing sites and to the cured compositions so obtained. In particular, it relates to curable polyacrylate rubber compositions which contain a novel curing system making those compositions more resistant to scorch during processing without adversely affecting the compression set of the cured compositions.

BACKGROUND OF THE INVENTION

Polyacrylate rubbers having dual cure sites, when cured, exhibit good weatherability, high temperature serviceability and resistance to oil. Such rubbers are particularly suitable for use as gaskets, seals, packings, belts and hoses, particularly under-the-hood in automobiles, and for out-of-door uses such as weather stripping.

Various curing systems for compositions containing polyacrylate rubbers having dual cure sites are taught by Morris, U.S. Pat. Nos. 3,910,866, 3,912,672 and 3,919,143. However, articles fabricated from such compositions may not be completely cured and may change their properties during normal use. It is apparent that fabricated articles, depending on their intended uses, are required to meet certain specifications, and changes in properties which take the articles out-of-specification would be unacceptable. Such changes can generally be avoided by adding a post-curing step when the articles are being fabricated. However, the post-curing step can be very time consuming.

Wolf, U.S. Pat. Nos. 5,008,345 and 5,081,194, teaches a no-post-cure method for curing compositions containing polyacrylate polymers having dual cure sites, particularly halogen and carboxyl cure sites, using a metallic acid salt and an ammonium or phosphonium quaternary salt as the curing system. The compositions are shelf stable prior to curing and give products having good compression set when cured.

Scorch is the cross-linking which occurs during processing of a curable system prior to curing and is a problem encountered with reactive curing systems. A retarder can be added to the curable system to retard scorch, and De Marco, U.S. Pat. No. 5,079,304 teaches using a substituted urea as the retarding agent with the acid salt and quaternary salt curing system of Wolf. However, those curable compositions generally have insufficient scorch safety for use in high speed injection molding.

Curable compositions exhibiting improved resistance to scorch, but where compression set of the cured compositions is not adversely affected are required for high speed injection molding. The present invention provides such curable compositions.

SUMMARY OF THE INVENTION

In one specific aspect, the present invention is the improvement in a method of curing a composition containing a polyacrylate rubber having halogen and carboxyl cure sites, which comprises using, in combination, as the curing system:

a) an alkali metal salt of a carboxylic acid of the formula $C_mH_{2m+1}COOM$ wherein M is an alkali metal and m is 3 to 23;

b) a tertiary amine of the formula $(CH_3)_2NC_nH_{2n+1}$ wherein n is 4 to 24, and c) a disubstituted urea of the formula:

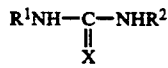

wherein X is oxygen or sulfur and $R^1$ and $R^2$ are each independently an aliphatic or aromatic radical containing 1 to 12 carbon atoms.

In another specific aspect, the present invention is a curable composition comprising (a) a curable polyacrylate rubber having halogen and carboxyl cure sites and comprising (i) from about 40 percent to about 99.8 percent by weight of an acrylate of the formula:

$$CH_2=CH-COOR$$

wherein R is selected from the group consisting of an alkyl radical containing 1 to 8 carbon atoms, an alkoxyalkyl, an alkylthioalkyl, and a cyanoalkyl radical containing 2 to 12 carbon atoms; (ii) from about 0.1 percent to about 30 percent by weight of a halogen-containing monomer selected from the group consisting of halogen-containing vinylene hydrocarbons and halogen-containing vinyl monomers having the halogen group at least two carbon atoms removed from an oxygen group; (iii) from about 0.1 percent to about 20 percent by weight of a carboxyl-containing monomer; and (iv) 0 to 35 percent by weight of a copolymerizable monomer containing a terminal vinylidene group; and b) a curing system comprising (i) an alkali metal salt of a carboxylic acid of the formula $C_mH_{2m+1}COOM$ wherein M is an alkali metal and m is 3 to 23; (ii) a tertiary amine of the formula $(CH_3)_2NC_nH_{2n+1}$ wherein n is 4 to 24, and (iii) a disubstituted area of the formula:

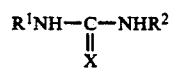

wherein X is oxygen or sulfur $R^1$ and $R^2$ are independently selected from the group consisting of aliphatic and aromatic radicals containing 1 to 12 carbon atoms.

In another specific aspect, the present invention is a cured polyacrylate rubber composition prepared by a process, which comprises:

mixing a polyacrylate rubber having halogen and carboxyl cure sites with a curative system until a uniform vulcanizable composition results;

said polyacrylate rubber comprising (i) from about 40 percent to about 99.8 percent by weight of an acrylate of the formula:

$$CH_2=CH-COOR$$

wherein R is selected from the group consisting of an alkyl radical containing 1 to 8 carbon atoms, an alkoxyalkyl, an alkylthioalkyl, and a cyanoalkyl radical containing 2 to 12 carbon atoms; (ii) from about 0.1 percent to about 30 percent by weight of a halogen-containing monomer selected from the group consisting of halogen-containing vinylene hydrocarbons and halogen-containing vinyl monomers having the halogen group at least two carbon atoms removed from an oxygen group; (iii) from about 0.1 percent to about 20 percent by weight of a carboxyl-containing monomer; and (iv) 0 to about 35 percent by weight of a copolymerizable monomer containing a terminal vinylidene group;

said curing system comprising (i) an alkali metal salt of a carboxylic acid of the formula $C_mH_{2m+1}COOM$ wherein M is an alkali metal and m is 3 to 23; (ii) a tertiary amine of the formula $(CH_3)_2C_nH_{2n+1}$ wherein n is 4 to 24; and (iii) a disubstituted urea of the formula:

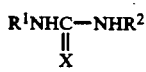

wherein X is sulfur or oxygen and $R^1$ and $R^2$ are independently selected from the group consisting of aliphatic and aromatic radicals containing 1 to 12 carbon atoms;

and curing the composition at about 150°–230° C.

DETAILED DESCRIPTION

The polyacrylate rubbers utilized in practicing the present invention are interpolymers comprising acrylate monomer(s), a reactive halogen-containing monomer and a carboxyl-containing monomer. Those rubbers contain from about 40% to about 99.8% by weight based upon the weight of the polymer, of an acrylate of the formula:

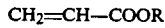

wherein R is an alkyl radical containing 1 to 8 carbon atoms, an alkoxyalkyl or alkylthioalkyl radical containing 2 to about 12 carbon atoms. The alkyl structure can contain primary, secondary, or tertiary carbon configurations. Examples of such acrylates are methyl acrylate, ethyl acrylate, propyl acrylate, n-butyl acrylate, isobutyl acrylate, n-pentyl acrylate, isoamyl acrylate, n-hexyl acrylate, 2-methylpentyl acrylate, n-octyl acrylate, 2-ethylhexyl acrylate, n-decyl acrylate, n-dodecyl acrylate, n-octadecyl acrylate, and the like; methoxymethyl acrylate, methoxyethyl acrylate, ethoxyethyl acrylate, butoxyethyl acrylate, ethoxypropyl acrylate, methylthioethyl acrylate, hexylthioethyl acrylate, and the like; and $\alpha,\beta$-cyanoethyl acrylate, $\alpha$, $\beta$-and $\delta$-cyanopropyl acrylate, cyanobutyl acrylate, cyanohexyl acrylate, cyanooctyl acrylate, and the like. Often mixtures of two or more monomers and/or types of acrylate monomers can be employed.

Preferably the rubbers contain from about 65% to about 99.6% by weight of acrylates of the formula set forth previously, wherein R is an alkyl radical containing 1 to about 8 carbon atoms or an alkoxyalkyl radical containing 2 to about 8 carbon atoms. Examples of the more preferred acrylates are ethyl acrylate, propyl acrylate, n-butyl acrylate, hexyl acrylate, 2-ethylhexyl acrylate, octyl acrylate, and the like and methoxyethyl acrylate, ethoxyethyl acrylate, and the like. Both an alkyl acrylate and an alkoxyalkyl acrylate can be used.

The rubbers contain from about 0.1% to about 30% by weight of an active halogen-containing monomer. The halogen groups can be chlorine, bromine, or iodine. Examples of such monomers are vinyl chloroacetate, vinyl bromoacetate, allyl chloroacetate, vinyl chloropropionate, vinyl chlorobutyrate, vinyl bromobutyrate, 2-chloroethyl acrylate, 3-chloropropyl acrylate, 4-chlorobutyl acrylate, 2-chloroethyl methacrylate, 2-bromoethyl acrylate, 2-iodoethyl acrylate, 2-chloroethyl vinyl ether, chloromethyl vinyl ketone, 4-chloro-2-butenyl acrylate, vinyl benzyl chloride, 5-chloromethyl-2-norbornene, 5-α-chloroacetoxymethyl)-2-norborene, 5-($\alpha,\beta$-dichloropropionylmethyl)-2-norbornene, and the like. The preferred monomers are vinyl chloracetate, allyl chloroacetate, 2-chloroethyl acrylate, 2-chloroethyl vinyl ether, vinyl benzyl chloride, 5-chloromethyl-2-norbornene, and 5-chloroacetoxymethyl-2-norbornene.

More preferably, the rubber contains from about 0.2% to about 15% by weight of the active halogen-containing monomer. At this level, the halogen content is from about 0.1% to about 5% by weight of the rubber. Due to the availability and cost, the chlorine-containing monomers are preferred.

The rubbers also contain from about 0.1% to about 20% by weight of a carboxyl-containing monomer. The monomer can be monocarboxylic or polycarboxylic, containing from about 3 to about 8 carbon atoms. Examples of such monomers are acrylic acid, methacrylic acid, ethacrylic acid, $\beta$, $\beta$-dimethylacrylic acid, crotonic acid, 2-pentenoic acid, 2-hexenoic acid, maleic acid, fumaric acid, citraconic acid, mesaconic acid, itaconic acid, 3-butene-1,2,3-tricarboxylic acid, and the like.

More preferably the rubber contains from 0.2% to about 10% by weight of the carboxyl-containing monomer. At this level, the carboxyl content is from about 0.1% to about 7% by weight of the rubber. The more preferred monomers are the monocarboxylic acid monomers such as acrylic acid, methacrylic acid, itaconic acid, and the like.

The rubber can contain 0 to about 35% and preferably up to about 10% by weight of other copolymerizable vinylidene monomers having a terminal vinylidene ($CH_2=C<$) group. Examples of such are phenyl acrylate, cyclohexyl acrylate, methacrylates such as methyl methacrylate, ethyl methacrylate, and the like; vinyl and allyl esters such as vinyl acetate, vinyl propionate, allyl acetate, and the like, vinyl ketones such as methyl vinyl ketone; vinyl and allyl ethers such as vinyl methyl ether vinyl, ethyl ether, allyl methyl ether, and the like; vinyl aromatics such as styrene, $\alpha$-methyl styrene, vinyl toluene, and the like; vinyl nitriles such as acrylonitrile and methacrylonitrile; vinylamides such as acrylamide, methacrylamide, N-methyl methacrylamide, and the like; and dienes and divinyls such as butadiene, isoprene, divinyl benzene, divinyl ether, diethylene glycol diacrylate, and the like. The more preferred copolymerizable monomers are vinyl acetate, methyl methacrylate, ethyl methacrylate, styrene, acrylonitrile, acrylamide, divinyl benzene, and diethylene glycol diacrylate.

The acrylate rubbers can be prepared using emulsion (latex), suspension, solution and bulk techniques known to those skilled in the art. Because it is desirable to polymerize the monomers to at least 90% conversion, emulsion and suspension techniques are usually employed. The polymerization can be performed as a batch reaction or one or more ingredients can be proportioned during the manufacturing process. Temperature of polymerization ranges from about $-10°$ C. to about 100° C., whereas a more preferred range is from about 5° C. to about 80° C.

The polymerization can be initiated by free-radical generating agents. Examples of such agents are organic peroxides and hydroperoxides such as benzoyl peroxide, dicumyl peroxide, cumene hydroperoxide, paramethane hydroperoxide, and the like, used alone or with redox systems; diazo compounds such as azobisisobutyronitrile, and the like; persulfate salts such as sodium potassium, and ammonium persulfate, used alone or with redox systems; and the use of ultraviolet light with photosensitive agents such as benzophenone, triphenylphosphine, organic diazos, and the like.

Typical emulsion polymerization ingredients would include a persulfate salt or organic peroxide and usually a redox system, water adjusted to the desired pH with acids or bases and usually buffered with inorganic salts, and either anionic, cationic, or nonionic surface active agents well known in the art.

The polymerization normally is continued until about 90% conversion of the monomers is obtained. The resulting latex (if the emulsion process is employed) can be coagulated to isolate the polymer. Typical coagulation procedures are salt-acid coagulations, use of polyvalent metal salts such as magnesium sulfate or calcium chloride, use of alcohols such as methanol, isopropyl alcohol, and freeze agglomeration techniques. The rubber is then usually washed with water and dried.

Polyacrylate rubbers have raw polymer Mooney values (ML-4 at 212° F.) from about 20 to about 100.

The three-part curing system of the present invention comprises (i) as the curative, 0.1-10 and preferably 2-6 parts by weight of an alkali metal carboxylate salt, (ii) as the accelerator, 0.5-4 and preferably 1-3 parts of a tertiary amine, and (iii), as a retarder, 0.5-7 and preferably 1-4 parts of a disubstituted urea each per 100 parts by weight of the polyacrylate polymer.

Suitable alkali metal salts of a carboxylic acid for use in practicing the present invention are those of the formula $C_mH_{2m+1}COOM$ wherein M is an alkali metal, preferably sodium or potassium, and m is an integer from 3 to 23, preferably 13 to 17 and more preferably 17. Sodium sterate is particularly preferred as the alkali metal carboxylate salt.

Suitable tertiary amines for use in practicing the present invention are those of the formula $(CH_3)_2NC_nH_{2n+1}$ wherein n is 4 to 24 and preferably 6 to 10. Tertiary amines wherein n is an even number are more generally available and are preferred for that reason. Dimethyloctylamine is particularly preferred.

Suitable disubstituted ureas for use practicing the present invention are those of the formula:

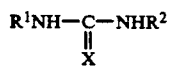

wherein X is sulfur or oxygen, with oxygen being preferred, and each of $R^1$ and $R^2$ is independently an aliphatic or aromatic radical containing 1 to 12 carbon atoms and preferably 1 to 6 carbons atoms. Examples of suitable substituted ureas are diphenylurea, 1,3-diethylthiourea, 1,3-dibutylthiourea, and 1,3-dimethylurea, with the later being preferred.

A polyacrylate rubber masterbatch, prepared in the usual manner as described in the patents discussed in the Background of the Invention, is admixed with the curing system using conventional equipment such as a Banbury mixer, extruders, and the like. The curable or vulcanizable composition, in addition to the curing system and the polyacrylate, may also include conventional carbon blacks, other fillers, antioxidants, emulsifiers, plasticizers, and the like conventionally known in the art.

The invention is further illustrated by means of the following non-limiting examples:

EXAMPLES

The curable compositions of the present invention were prepared by mixing all components, except for the curing systems, in a Banbury mixer at room temperatures (25° C.). The curing system, sodium stearate, dimethyloctylamine and dimethylurea, were added, and the compositions uniformly blended using a Banbury mixer.

|  | Example 1 | Example 2 |
|---|---|---|
| Dual Cure Site Polyacrylate Rubber | 100.0 | 100.0 |
| Fatty Acid Ester Processing Aid | 2.0 | 2.0 |
| Octylated Diphenylamine | 2.0 | 2.0 |
| Stearic Acid | 1.0 | 1.0 |
| Carbon Black | 65.0 | 60.0 |
| Sodium Stearate | 4.0 | 4.0 |
| Dimethyloctylamine | 1.0 | 1.0 |
| Dimethyl urea | 2.0 | 2.0 |
| TOTAL: | 177.00 | 172.00 |

The viscosities of the compositions were measured using a Mooney Viscometer, large rotor, at 125° C.

|  | Example 1 | Example 2 | Example 2' |
|---|---|---|---|
| VISC.MINIMUM | 20 | 34.7 | 38.9 |
| T5, minutes | 5.5 | 4.3 | 3.9 |
| T35, minutes | 10.9 | 7.6 | 7.1 |

The results obtained with a rheometer oscillating disc using a microdie at 100 cpm, 3° arc at 190° C., are tabulated below:

|  | Example 1 | Example 2 | Example 2' |
|---|---|---|---|
| ML, lbf-in | 5.7 | 7.6 | 7.8 |
| ML, N-m | 0.6 | 0.8 | 0.9 |
| MH, lbf-in | 27.1 | 29.2 | 30.6 |
| MH, N-m | 3.0 | 3.2 | 3.4 |
| T$_s$2, minutes | 1.1 | 1.3 | 1.2 |
| T90 minutes | 4.5 | 7.4 | 8.2 |

Example 2' is the composition of Example 2 after standing for two weeks and is illustrative of the storage-stability of the curable compositions of the present invention.

The results after curing for 4 minutes at 190° C. and post-curing for 4 hours at 177° C. (composition of Example 1) or for 6 minutes at 190° C. (composition of Example 2) are tabulated below:

|  | Example 1 | Example 2 |
|---|---|---|
| STRESS 100%, psi | 614 | 490 |
| STRESS 100%, MPa | 4.2 | 3.4 |
| TENSILE, psi | 1861 | 1330 |
| TENSILE, MPa | 12.8 | 9.2 |
| ELONGATION, % | 225 | 210 |
| HARDNESS, A pts | 71 | 55 |

Percent compression set after 70 hours at 150° C., Example 1, 25.9%, and after 22 hours at 150° C., Example 2, 17.2%.

| EXAMPLE | 3 | 4 | 5 | 6 | 7 | 8 | 9 | 10 | 11 | 12 | 13 | 14 | 15 |
|---|---|---|---|---|---|---|---|---|---|---|---|---|---|
| Dual Cure Site Polyacrylate Rubber | 100 | 100 | 100 | 100 | 100 | 100 | 100 | 100 | 100 | 100 | 100 | 100 | 100 |
| Fatty Acid Ester Processing Aid | 2 | 2 | 2 | 2 | 2 | 2 | 2 | 2 | 2 | 2 | 2 | 2 | 2 |
| Substituted Diphenylamine | 2 | 2 | 2 | 2 | 2 | 2 | 2 | 2 | 2 | 2 | 2 | 2 | 2 |
| Carbon Black | 52 | 52 | 52 | 52 | 52 | 52 | 52 | 52 | 52 | 52 | 52 | 52 | 52 |
| Stearic Acid | | | | | | | | 2 | 2 | 2 | 2 | 2 | 2 |
| Sodium Stearate | 3 | 5 | 5 | 5 | 4 | 3 | 3 | 4 | 5 | 3 | 3 | 3 | 5 |
| Dimethyloctylamine | 1.3 | 1.3 | 0.7 | 0.7 | 1.0 | 0.7 | 0.7 | 0.7 | 1.0 | 0.7 | 1.3 | 1.0 | 0.7 |
| Dimethylurea | 1 | 3 | 3 | 1 | 2 | 3 | 1 | 1 | 3 | 3 | 2 | 1 | 2 |
| TOTAL | 161.3 | 165.30 | 164.70 | 162.70 | 163.0 | 162.70 | 160.70 | 163.70 | 167.00 | 164.70 | 164.30 | 163.0 | 165.70 |
| MOONEY VISCOMETER: | | | | | | | | | | | | | |
| VISC.MINIMUM | 35.8 | 27.7 | 34.9 | 39.8 | 33.4 | 31.4 | 35.9 | 26.9 | 20.9 | 25.2 | 27.0 | 28.7 | 22.5 |
| T5.minutes | 2.1 | 4.3 | 4.0 | 2.1 | 2.7 | 4.0 | 2.1 | 4.9 | 13.0 | 10.0 | 6.4 | 4.5 | 12.7 |
| T35.minutes | 3.7 | 9.8 | 8.5 | 3.9 | 5.6 | 9.4 | 4.5 | 16.5 | 20.0 | 29.7 | 18.6 | 10.7 | 29.9 |
| RHEOMETER. MICRODIE.100 | | | | | | | | | | | | | |
| ML.lfb*in | 13.8 | 11.0 | 10.8 | 11.6 | 11.4 | 10.2 | 12.6 | 11.6 | 9.6 | 9.0 | 10.2 | 10.6 | 9.8 |
| ML.N*m | 1.5 | 1.2 | 1.2 | 1.3 | 1.3 | 1.1 | 1.4 | 1.3 | 1.1 | 1.0 | 1.1 | 1.2 | 1.1 |
| MH.lfb*in | 36.4 | 30.8 | 32.8 | 35.0 | 32.8 | 33.6 | 37.0 | 28.0 | 25.4 | 25.8 | 26.6 | 28.6 | 26.4 |
| MH.N*m | 4.0 | 3.4 | 3.6 | 3.9 | 3.6 | 3.7 | 4.1 | 3.1 | 2.8 | 2.9 | 3.0 | 3.2 | 2.9 |
| T2s.minutes | 0.8 | 1.0 | 1.1 | 0.9 | 0.8 | 1.0 | 1.0 | 1.0 | 1.2 | 1.6 | 1.2 | 1.1 | 1.4 |
| T'90.minutes | 4.9 | 5.2 | 7.4 | 6.1 | 5.0 | 7.8 | 6.9 | 5.2 | 6.2 | 9.9 | 7.3 | 7.6 | 8.4 |

The percentage compression sets for the compositions of Examples 3-15 (cured for 10 minutes at 190° C. and post-cured for 4 hours at 177° C.) ranged from 2.2 to 27.5%.

As illustrated by Examples 2 and 2', the curable compositions of the present invention exhibit excellent shelf stability, with only a very small change in viscosity over time, particularly when stored at a temperature below about 50° C. They have a large margin of scorch safety when being preheated prior to injection molding and cure rapidly during injection molding at mold temperatures of about 150°-230° C. The molded articles produced have superior mechanical properties.

A problem often encountered when using prior art curing systems in injection molding is called "blooming". That term designates the formation of a material visible on the surface of the molded article several hours or days after it has been molded. The material may be powdery, waxy or greasy and detracts from the appearance of the molded article. "Blooming" does not occur when using the novel curing system of the present invention.

What is claimed is:

1. A curable composition comprising:
   (a) a curable polyacrylate rubber having halogen and carboxyl cure sites and comprising (i) from about 40 percent to about 99.8 percent by weight of an acrylate of the formula:

   $CH_2=CH-COOR$ wherein R is selected from the group consisting of an alkyl radical containing 1 to 8 carbon atoms, an alkoxyalkyl, an alkylthioalkyl, and a cyanoalkyl radical containing 2 to 12 carbon atoms; (ii) from about 0.1 percent to about 30 percent by weight of a halogen-containing monomer selected from the group consisting of halogen-containing vinylene hydrocarbons and halogen-containing vinyl monomers having the halogen group at least two carbon atoms removed from an oxygen group; (iii) from about 0.1 percent to about 20 percent by weight of a carboxyl-containing monomer; and (iv) 0 to 35 percent by weight of a copolymerizable monomer containing a terminal vinylidene group; and
   (b) an effective amount of a curing system comprising (i) as a curative, an alkali metal carboxylate salt of the formula $C_mH_{2m+1}COOM$ wherein M is an alkali metal and m is 3 to 23; (ii) as an accelerator, a tertiary amine of the formula $(CH_3)_2NC_nH_{2n+1}$ wherein n is 4 to 24; and (iii) as a retarder, a disubstituted urea of the formula:

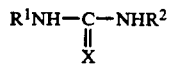
   $$R^1NH-\underset{X}{\underset{\|}{C}}-NHR^2$$

wherein X is sulfur or oxygen, and $R^1$ and $R^2$ are independently selected from the group consisting of aliphatic and aromatic radicals containing 1 to 12 carbon atoms.

2. A curable composition according to claim 1, wherein the curing system contains 0.1 to 10 parts of the alkali metal carboxylate salt, 1-4 parts of the tertiary amine and 0.5 to 7 parts of the disubstituted urea per 100 parts by weight of the polyacrylate polymer.

3. A curable composition according to claim 2, wherein M is sodium or potassium, m is 13 to 17, n is 6 to 10, X is oxygen and $R^1$ and $R^2$ are each an aliphatic radical containing 1 to 12 carbon atoms.

4. A curable composition according to claim 3, wherein M is sodium, m is 17, n is 8, and $R^1$ and $R^2$ each contain 1 to 6 carbon atoms.

5. A curable composition according to claim 4, wherein the disubstituted urea is dimethylurea.

6. In a method of curing a composition containing a polyacrylate rubber having halogen and carboxyl cure sites, the improvement which comprises using, in combination, as the curative system:
   a) an alkali metal salt of a carboxylic acid of the formula $C_mH_{2m+1}COOM$ wherein M is an alkali metal and m is 3 to 13;

b) a tertiary amine of the formula $(CH_3)_2NC_nH_{2n+1}$
wherein n is 4 to 24, and
c) a disubstituted urea of the formula:
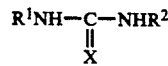
wherein X is oxygen or sulfur and $R^1$ and $R^2$ are each independently an aliphatic or aromatic radical containing 1 to 12 carbon atoms.
* * * * *